United States Patent [19]
Fukiura et al.

[11] Patent Number: 5,211,058
[45] Date of Patent: May 18, 1993

[54] CAPACITIVE PRESSURE SENSOR AND METHOD OF MANUFACTURING THE SAME

[75] Inventors: Takeshi Fukiura; Shigeo Kimura; Yoshiyuki Ishikura; Ikuo Nishimoto, all of Kanagawa, Japan

[73] Assignee: Yamatake-Honeywell Co., Ltd., Japan

[21] Appl. No.: 771,508

[22] Filed: Oct. 4, 1991

[30] Foreign Application Priority Data

Oct. 5, 1990 [JP] Japan .................. 2-266688

[51] Int. Cl.$^5$ .............. G01L 7/08; G01L 9/12
[52] U.S. Cl. .................. 73/724; 29/25.41; 73/718; 361/283
[58] Field of Search .......... 73/718, 724, 721; 29/25.41; 361/283

[56] References Cited
U.S. PATENT DOCUMENTS
4,445,384 5/1984 Royer .................. 73/724

FOREIGN PATENT DOCUMENTS
63-298130 12/1988 Japan .

Primary Examiner—Donald O. Woodiel
Attorney, Agent, or Firm—Blakely, Sokoloff, Taylor & Zafman

[57] ABSTRACT

According to a capacitive pressure sensor and a method of manufacturing the same, first and second grooves are formed in one and the other surfaces of a substrate, respectively. A sacrificial layer is embedded in the first groove. Insulating films are formed on the substrate, on which the sacrificial layer is formed, to sandwich an electrode. Etching is performed to form a pressure introducing hole through the substrate to reach the sacrificial layer. A hollow portion is formed by removing the sacrificial layer through the pressure introducing hole.

7 Claims, 2 Drawing Sheets

CAPACITIVE PRESSURE SENSOR AND METHOD OF MANUFACTURING THE SAME

BACKGROUND OF THE INVENTION

The present invention relates to a capacitive pressure sensor having a diaphragm structure and designed to capacitively detect a change in pressure under measurement, and a method of manufacturing the same.

FIG. 4 shows the arrangement of a capacitive pressure sensor of this type, e.g., disclosed in Japanese Patent Laid-Open No. 63-298130. Referring to FIG. 4, a diaphragm 45 having an upper movable electrode 44 is formed through a hollow portion 43 on a lower stationary electrode 41 formed on the upper surface of a photosensitive glass substrate 42. A pressure introducing fine hole 46 communicating with the hollow portion 43 is formed through the photosensitive glass substrate 42, thus forming a diaphragm structure.

FIGS. 5A to 5D show a method of manufacturing a capacitive pressure sensor of this type, e.g., disclosed in Japanese Patent Laid-Open No. 63-208735. As shown in FIG. 5A, a thin film 47 consisting of a solution containing a pyrolysis material is formed on a photosensitive glass substrate 42 having a surface on which a lower stationary electrode 41 is formed. Thereafter, as shown in FIG. 5B, a metal deposition film 48 is formed on the thin film 47. After the thin film 47 is patterned to have a specific shape by using the metal deposition film 48 as a protective mask, as shown in FIG. 5C, a metal film is stacked on the metal deposition film 48 and its peripheral portion on the photosensitive glass substrate 42, thus forming a diaphragm 45, as shown in FIG. 5D. Subsequently, a hollow portion 43 equivalent to the one shown in FIG. 4 is formed by removing the pyrolysis material of the thin film 47 by pyrolytically decomposing it, thus forming a diaphragm structure.

In general, a stepped portion of a film formed by a thin-film forming process is thinner and lower in quality than a non-stepped portion. In addition, it is known that the thickness and quality of a stepped portion are difficult to control compared with a non-stepped portion.

Furthermore, when a diaphragm receives a pressure, a maximum stress is produced at an end portion of a movable portion. As a result, the mechanical characteristics of the diaphragm end portion greatly affect the mechanical characteristics of the overall diaphragm, especially the pressure displacement conversion characteristics (the flexibility of the diaphragm) and the excessive pressure resistance characteristics (the durability of the diaphragm). Therefore, when a diaphragm portion is to be formed of a thin film, no stepped portion is preferably formed at an end portion of a movable portion of the diaphragm.

In practice, however, stepped portions are formed at end portions of the movable portion of the diaphragm, as shown in FIG. 4. Therefore, the mechanical characteristics of the movable portion of the diaphragm are degraded. Moreover, when diaphragms are mass-produced, the mechanical characteristics of the movable portions may vary. This is because stepped portions are inevitably formed at end portions of the movable portions of diaphragms manufactured by the conventional manufacturing method, as shown in FIGS. 5A to 5D.

SUMMARY OF THE INVENTION

It is an object of the present invention to provide a capacitive pressure sensor which is capable of reducing variations in output with respect to a pressure, and a method of manufacturing the same.

It is another object of the present invention to provide a capacitive pressure sensor having high pressure resistance, a variation of which is small, and a method of manufacturing the same.

It is still another object of the present invention to provide a capacitive pressure sensor which can be easily manufactured by a collective manufacturing process with high precision at low cost, and a method of manufacturing the same.

In order to achieve the above objects, according to the present invention, there is provided a capacitive pressure sensor comprising a substrate having a first film electrode formed on one surface thereof, a hollow portion formed on a first electrode side of the substrate, a diaphragm covering the hollow portion in the substrate and integrally formed by sandwiching a second film electrode between insulating films, opposite to the first film electrode to be sandwiched, and a pressure introducing hole formed through the substrate to communicate with the hollow portion.

In addition, there is provided a method of manufacturing a capacitive pressure sensor, comprising the steps of forming first and second grooves in one and the other surfaces of a substrate, respectively, embedding a sacrificial layer in the first groove, forming insulating films on the substrate, on which the sacrificial layer is formed, to sandwich an electrode, etching the substrate from the other surface thereof to form a pressure introducing hole reaching the sacrificial layer, and forming a hollow portion by removing the sacrificial layer through the pressure introducing hole.

BRIEF DESCRIPTION OF THE DRAWINGS

FIGS. 1A and 1B show the arrangement of a capacitive pressure sensor according to an embodiment of the present invention, in which FIG. 1A is a plan view of the sensor and FIG. 1B is a sectional view taken along a line A—A in FIG. 1A;

FIGS. 3A and 3B show the arrangement of a capacitive pressure sensor according to another embodiment of the present invention in which FIG. 3A is a plan view of the sensor and FIG. 3B is a sectional view taken along a line B—B in FIG. 3A;

DESCRIPTION OF THE PREFERRED EMBODIMENTS

Embodiments of the present invention will hereinafter be described in detail with reference to the accompanying drawings.

Figure 1A:
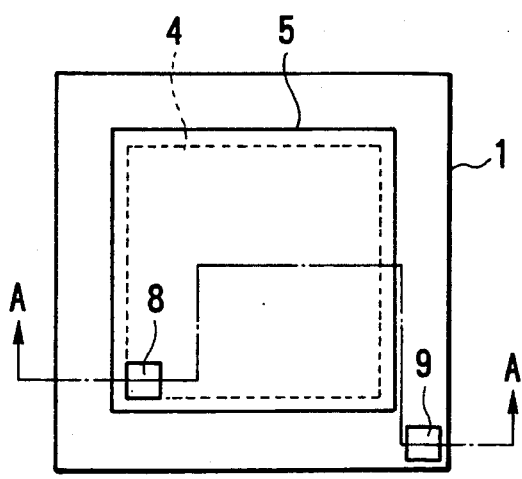
Figure 1B:
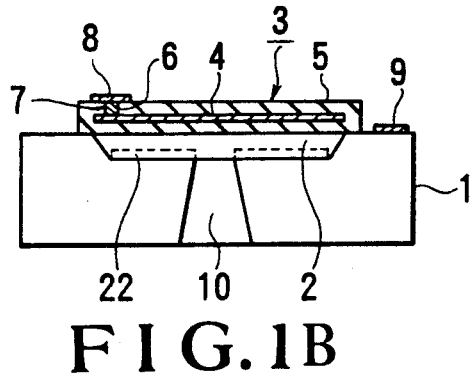

FIGS. 1A and 1B show the arrangement of a capacitive pressure sensor according to an embodiment of the present invention. Referring to FIGS. 1A and 1B, a shallow hollow portion 2 having a rectangular shape as a whole and having a U-shaped cross-section is formed in a central portion of the upper surface of a substrate 1. On the substrate 1 in which the hollow portion 2 is formed, a thin-film diaphragm 3 is formed to cover the hollow portion 2. The peripheral and central portions of the diaphragm 3 serve as stationary and movable portions, respectively. The diaphragm 3 has a multi-layer structure in which an upper electrode 4 is sandwiched between insulating films 5 comprised in the movable portion of the diaphragm 3. An opening 6 is formed through the upper insulation film 5 in a corner portion to reach the film 5. A conductive member 7 is embedded in the opening. In addition, an electrode terminal 8 is formed on this conductive member 7 to be electrically connected to the upper electrode 4. An electrode terminal 9 is formed on a corner portion of the substrate 1 to be electrically connected thereto. A pressure introducing hole 10 is formed from the lower surface of the substrate 1 therethrough to communicate with the hollow portion 2. The substrate 1, if made of a metal plate, serves as a lower electrode which opposes the upper electrode 4 and the hollow portion 2 to constitute a capacitor structure. If the substrate 1 is constituted by a semiconductor, a metal electrode 22 indicated by dotted lines is formed on the bottom of the hollow portion 2 to oppose the upper electrode 4, and the electrode terminal 9 is electrically connected to the metal electrode 22.

According to this arrangement, since the diaphragm 3 is integrally formed on the substrate 1 through the hollow portion 2 as a small gap, and the capacitor structure is constituted by the upper electrode 4 and the substrate 1 with the hollow portion 2 formed therebetween, when a pressure is introduced from the pressure introducing hole 10, the movable portion of the diaphragm 3 is vertically moved or displaced in accordance with an amount of a pressure under measurement. The pressure is then detected based on a change in capacitance of the capacitor structure due to this displacement.

Figure 2A:
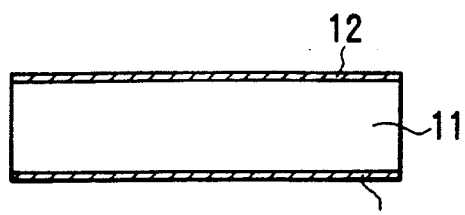
FIGS. 2A to 2E are sectional views showing the steps in a method of manufacturing the sensor shown in FIGS. 1A and 1B.
Figure 2B:
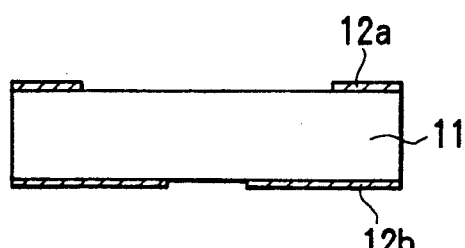
Figure 2C:
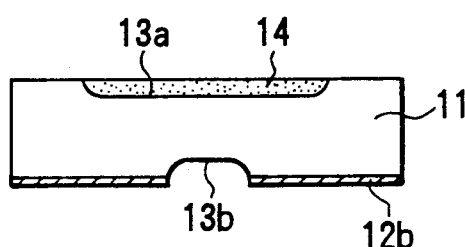
Figure 2D:
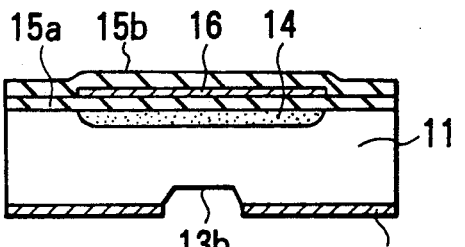
Figure 2E:
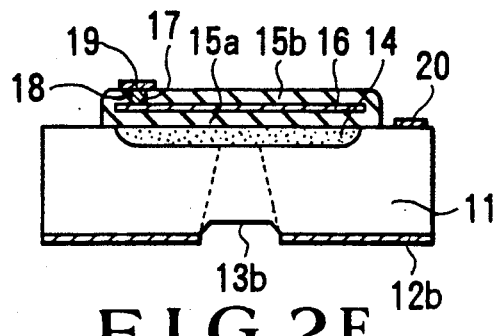

FIGS. 2A to 2E are sectional views for explaining the steps in a method of manufacturing the capacitive pressure sensor shown in FIGS. 1A and 1B. As shown in FIG. 2A, etching mask films 12 consisting of, e.g., $SiO_2$ or $SiN_x$ are formed on the upper and lower surfaces of, e.g., an Si substrate 11. Thereafter, the etching mask film 12 is patterned by photoetching to form predetermined masks 12a and 12b, as shown in FIG. 2B. As shown in FIG. 2C, the upper and lower surfaces of the Si substrate 11 are etched by using the masks 12a and 12b to form grooves 13a and 13b respectively having predetermined depths. Subsequently, a sacrificial layer 14 having a thickness larger than the depth of the groove 13a is formed on the entire upper surface of the Si substrate 11, and the resultant structure is polished to form a structure in which the sacrificial layer is embedded in the groove 13a, as shown in FIG. 2C. In the next step, as shown in FIG. 2D, a conductive film as an upper electrode 16 is formed on the upper surface of the Si substrate 11, in which the sacrificial layer 14 is embedded, by a normal thin-film forming process so as to be sandwiched between first and second insulating films 15a and 15b. An opening 17 is formed by etching in a predetermined portion of the second insulating film 15b, and a conductive member 18 is embedded in the opening 17 by a normal thin-film forming process. Thereafter, an electrode terminal 19 is formed on the conductive member 18 to be electrically connected to the upper electrode 16. Similarly, an electrode terminal 20 is formed on a corner portion of the Si substrate 11 to be electrically connected thereto. In the next step, the groove 13b in the lower surface of the Si substrate 11 is subjected to wet etching to form a pressure introducing hole 10 reaching the sacrificial layer 14. In addition, the sacrificial layer 14 is removed through this pressure introducing hole 10 to form a capacitor structure equivalent to the structure shown in FIG. 1B in which the substrate 1 and the diaphragm 3 are integrally formed with the hollow portion 2 intervening therebetween.

The arrangement described above provides a diaphragm structure having flat surface, in which no stepped portions are formed at the movable end portions of the movable diaphragm 3. In addition, according to this method, it is possible to easily form a capacitor structure, by a series of manufacturing processes, which has a greatly reduced dimension between electrodes in high dimensional accuracy.

Figure 3A:
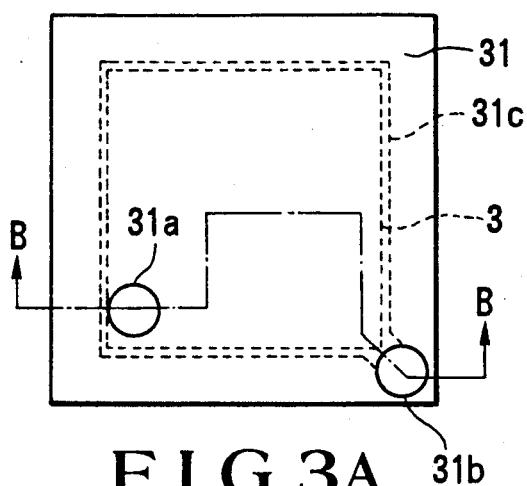
Figure 3B:
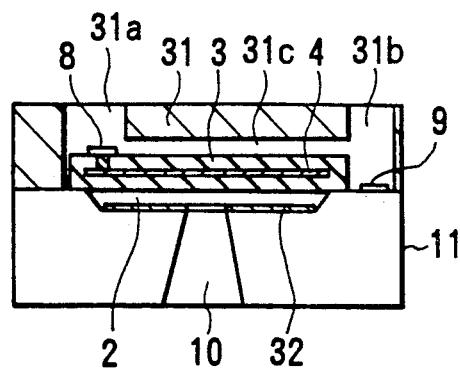
Figure 4:
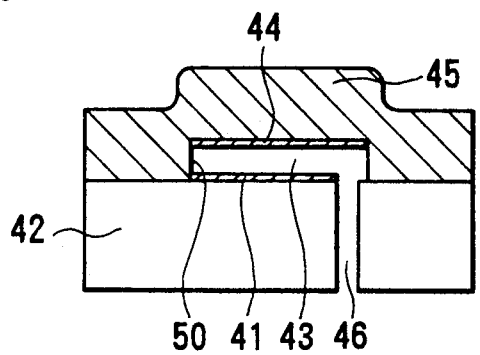
FIG. 4 is a sectional view of a prior art capacitor sensor.
Figure 5A:
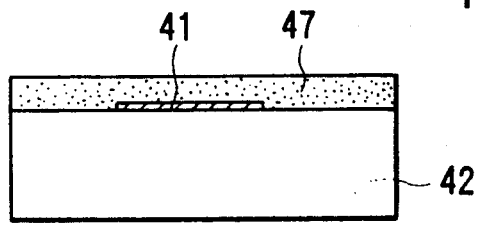
FIGS. 5A to 5D are sectional views showing the steps in a method of manufacturing a conventional capacitive pressure sensor.
Figure 5C:
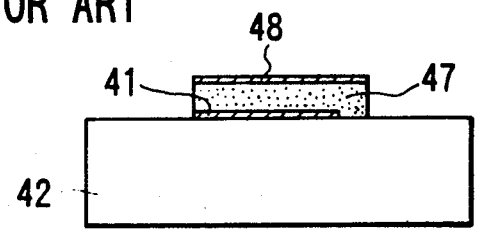
Figure 5B:
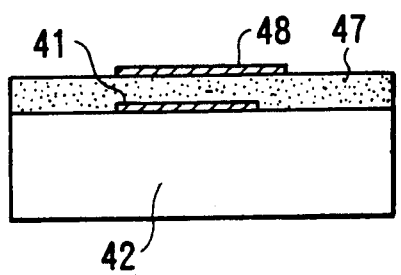
Figure 5D:
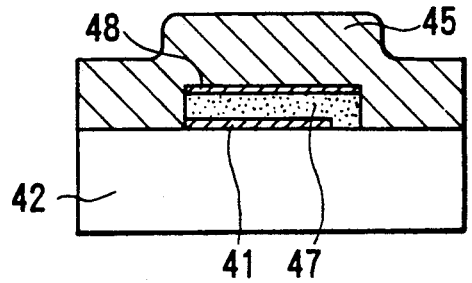

FIGS. 3A and 3B show the arrangement of a capacitive pressure sensor according to another embodiment of the present invention. The same reference numerals in FIGS. 3A and 3B denote the same parts as those in FIGS. 1A and 1B. The arrangement shown in FIGS. 3A and 3B is different from that shown in FIGS. 1A and 1B in that a plurality of through holes 31a and 31b as fluid paths are formed on a substrate 11 on which a diaphragm 3 is formed, and a lid-like stopper structure 31 is bonded on the substrate 11 by, e.g., anode bonding disclosed in U.S. Pat. No. 3,397,278 so as to form a predetermined gap 31c between the stopper 31 and the diaphragm 3. In addition, a lower electrode 32 is formed on the bottom surface of a hollow portion formed in the SI substrate 11. The lower electrode 32 and an upper electrode in the diaphragm 3 constitute a capacitor structure with the hollow portion 2 formed therebetween.

In addition to the same effect as that produced by the first embodiment, according to this arrangement, the same effect as that described above can be obtained. In addition, even if the substrate 1 is pressurized from below, the diaphragm portion 3 is mechanically protected against an excessive displacement, whereby the pressure resistance can be enhanced.

When a pressure is converted into a capacitance by the capacitive pressure sensor shown in FIGS. 1A or 3B. In measurement of this capacitance, a careful consideration must be given to a stray capacitance included in a measured capacitance value. More specifically, in order to measure the capacitance between the opposite electrodes, the opposite electrodes are connected to a measuring circuit, wherein the stray capacitance of leads extending from the opposite electrodes to the measuring circuit is added to the capacitance between the opposite electrodes. If this stray capacitance greatly varies, the measurement precision of the pressure sensor is degraded accordingly. In order to solve such a problem, the substrate portion of each of the capacitive pressure sensors shown in FIGS. 1A to 3B may be constituted by a semiconductor substrate, e.g., a monocrystalline silicon substrate, and a capacitance measuring circuit or a part thereof may be formed near a pressure sensor mechanism on the semiconductor substrate.

Since the above-mentioned arrangement can largely reduce the stray capacitance between the opposite electrodes and the capacitance measuring circuit, the variation in stray capacitance is suppressed. Therefore, the precision of the pressure sensor can be improved accordingly. Alternatively, instead of improving the precision, the size of the pressure sensor structure may be further decreased. In this case, since the capacitance measurement circuit is also mounted on the substrate, the pressure sensor measurement system can be greatly reduced in size as a whole.

In the above-described embodiment, in order to obtain the Si substrate 11 having a flat surface, the groove 13a having a U-shaped cross-section is formed in the Si substrate 11, and the sacrificial layer 14 is embedded in the etching groove 13a. However, the present invention is not limited to this method. For example, an n-type Si substrate may be used as the Si substrate 11, and an impurity is selectively diffused in the substrate at a high concentration to form a diffusion layer as a buried layer. In this case, after an opening is formed in the lower surface of the n-type Si substrate to reach the buried layer, the hollow portion 2 is formed by selectively etching the buried layer by using an etching solution containing, e.g., hydrofluoric acid:nitric acid:acetic acid=1:3:8. With this process, the diaphragm portion 3 having the same structure as described above can be formed.

In the above-described embodiments, the movable end portions of diaphragms have no stepped portions. However, if the sacrificial layer shown in FIG. 2C slightly protrudes from the substrate surface, the movable end portions of the eventually formed diaphragm may have low stepped portions. Even in this case, the same excellent effect as that described above can be obtained.

Furthermore, although in each embodiment described above, the movable diaphragm portion has a rectangular shape, the present invention is not limited to this shape. It is apparent that the movable diaphragm portion may have a polygonal or round shape.

As has been described, according to the capacitive pressure sensor of the present invention, the hollow portion between the capacitor electrodes can be reduced in size, and a diaphragm having movable end portions without stepped portions can be formed as a thin film, thus providing a pressure sensor which produces a large capacitance change in response to a pressure and presents a high resistance to an excessive pressure. In addition, in such pressure sensors, variations in output and pressure resistance are small. Also, according to such a manufacturing method, a high-precision, low-cost, and compact pressure sensor can be easily formed by a thin-film process, thus providing excellent effects.

What is claimed is:

1. A capacitive pressure sensor comprising:
    a substrate having a first film electrode formed on one surface thereof;
    a hollow portion formed on a first electrode side of said substrate;
    a diaphragm covering said hollow portion in said substrate and integrally formed by sandwiching a second film electrode between insulating films opposite to said first film electrode to be sandwiched; and
    a pressure introducing hole formed through said substrate to communicate with said hollow portion.

2. A sensor according to claim 1, wherein said diaphragm is formed to have no stepped portion at a movable end portion.

3. A sensor according to claim 1, wherein said substrate is constituted by a semiconductor substrate, and said first film electrode is formed on a bottom surface of said hollow portion formed in said semiconductor substrate.

4. A sensor according to claim 1, wherein said substrate is constituted by a semiconductor substrate, and a capacitance measuring circuit or a part thereof is formed on said semiconductor substrate.

5. A sensor according to claim 1, further comprising a lid-like stopper structure formed opposite to said diaphragm with a predetermined gap, said substrate intervening therebetween.

6. A sensor according to claim 5, wherein said stopper structure has through holes.

7. A method of manufacturing a capacitive pressure sensor comprising the steps of:
    forming first and second grooves in one and the other surfaces of a substrate, respectively;
    embedding a sacrificial layer in said first groove;
    forming insulating films on said substrate, on which said sacrificial layer is formed, to sandwich an electrode;
    etching said substrate from the other surface thereof to form a pressure introducing hole reaching said sacrificial layer;
    forming a hollow portion by removing said sacrificial layer through said pressure introducing hole; and
    forming a film electrode on a bottom surface of said first groove.

* * * * *